US012701543B2

(12) United States Patent
Henry et al.

(10) Patent No.: US 12,701,543 B2
(45) Date of Patent: Aug. 4, 2026

(54) NETWORK DEVICE MOVEMENT DETECTION

(71) Applicant: Cisco Technology, Inc., San Jose, CA (US)

(72) Inventors: Jerome Henry, Pittsboro, NC (US); Ather Kanak, Mountain House, CA (US); Ardalan Alizadeh, Campbell, CA (US); Joel Aller, Milpitas, CA (US); Peiman Amini, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 295 days.

(21) Appl. No.: 18/469,761

(22) Filed: Sep. 19, 2023

(65) Prior Publication Data

US 2025/0097896 A1 Mar. 20, 2025

(51) Int. Cl.
*H04W 64/00* (2009.01)
*H04B 17/318* (2015.01)
*H04W 24/08* (2009.01)

(52) U.S. Cl.
CPC ........ *H04W 64/006* (2013.01); *H04B 17/318* (2015.01); *H04W 24/08* (2013.01)

(58) Field of Classification Search
CPC ......... H04W 4/38; H04W 4/029; H04W 4/02; H04W 84/12; H04W 24/02; H04W 16/18;
(Continued)

(56) References Cited

U.S. PATENT DOCUMENTS 8,539,590 B2 * 9/2013 Lee ............................ H02J 7/00
713/193

9,092,957 B2 * 7/2015 Berger .................. G08B 21/00
(Continued)

FOREIGN PATENT DOCUMENTS

| CN | 112954756 A | 6/2021 |
| KR | 102084042 B1 | 4/2020 |
| WO | 2017180275 A1 | 10/2017 |

OTHER PUBLICATIONS

International Search Report and Written Opinion for International Application No. PCT/US2024/047115, mailed Dec. 4, 2024, 16 Pages.

*Primary Examiner* — Kwasi Karikari
(74) *Attorney, Agent, or Firm* — Rutan & Tucker, LLP; Ravi Mohan; Marc A. McClain

(57) ABSTRACT

Devices, systems, methods, and processes for detecting anomalous movements within network devices are described herein. Certain movements within networks devices are predictable and negligible. However, other movements may indicate a larger problem with the network, or network devices, especially when the network devices (e.g., access points) are within a stationary deployment. For example, a sudden movement of a network device may indicate that it has fallen, been moved, or is under threat of a physical attack. Many network devices are being deployed with various environmental sensors. These sensors can be utilized to detect movement of the network device. This can be done by evaluating the received signal strength indicator levels as well as the output of the environmental sensor. If an anomalous movement is detected, preventative actions can be taken such as rebooting or limiting access. This can be done on the network device or by a centralized management system.

20 Claims, 11 Drawing Sheets

(58) Field of Classification Search
CPC ... H04W 64/00; H04W 4/025; H04W 64/003;
H04W 12/50; H04W 40/10; H04W 40/12;
H04W 52/0251
See application file for complete search history.

(56) References Cited

U.S. PATENT DOCUMENTS

| | | | |
|---|---|---|---|
| 10,462,015 B1 | 10/2019 | Henry et al. | |
| 12,142,132 B1 * | 11/2024 | Ibarra | G08B 29/04 |
| 2014/0187257 A1 | 7/2014 | Emadzadeh et al. | |
| 2016/0357994 A1 * | 12/2016 | Kanakarajan | H04L 41/12 |
| 2017/0272911 A1 | 9/2017 | Agrawal et al. | |
| 2018/0259386 A1 * | 9/2018 | Ueda | G05B 15/02 |
| 2019/0306826 A1 | 10/2019 | Do et al. | |
| 2021/0227601 A1 * | 7/2021 | Eom | H04W 12/50 |
| 2023/0047635 A1 | 2/2023 | Friday et al. | |

* cited by examiner

Figure 4:
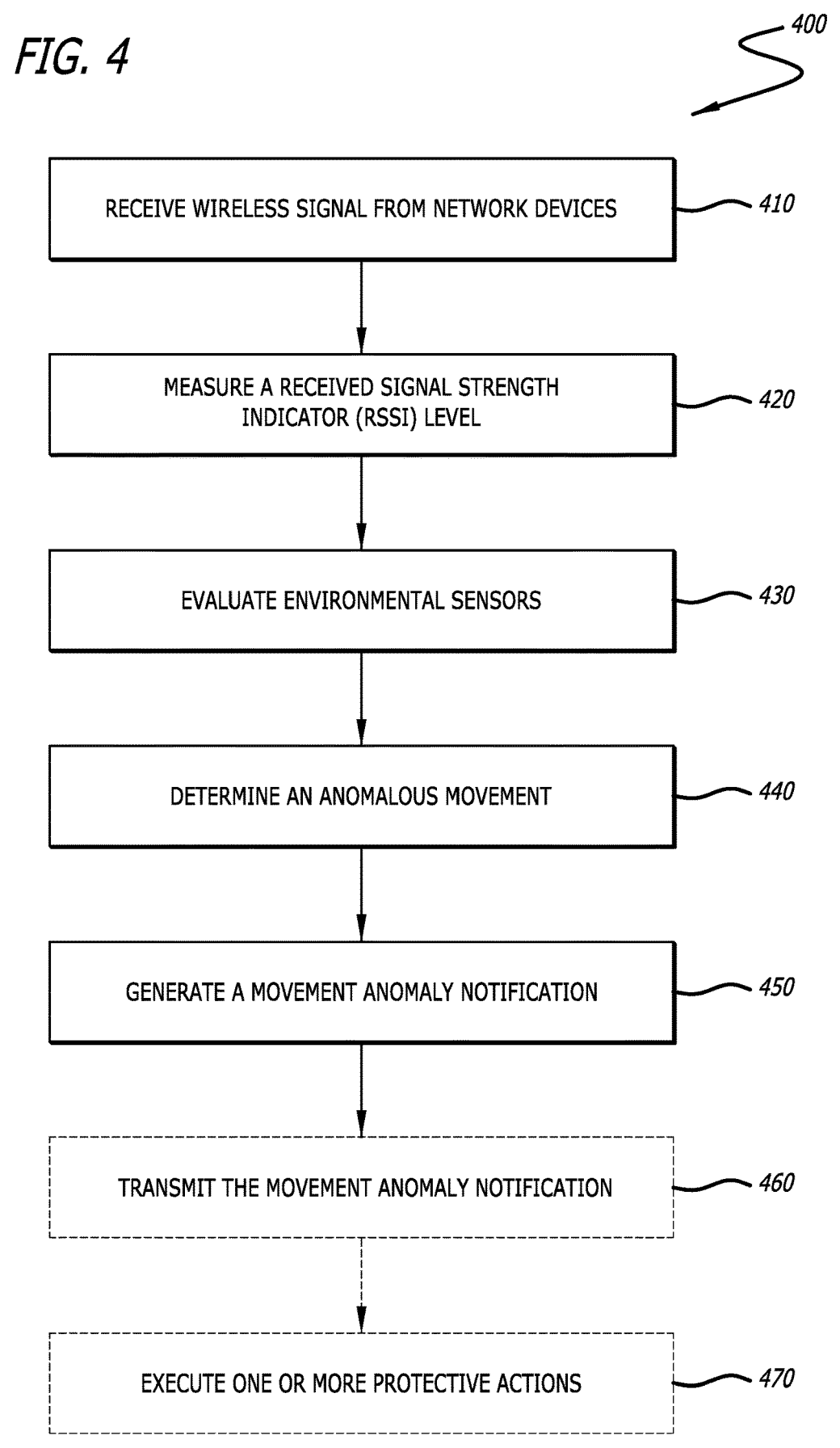

| RECEIVE WIRELESS SIGNAL FROM NETWORK DEVICES | 410 |

| MEASURE A RECEIVED SIGNAL STRENGTH INDICATOR (RSSI) LEVEL | 420 |

| EVALUATE ENVIRONMENTAL SENSORS | 430 |

| DETERMINE AN ANOMALOUS MOVEMENT | 440 |

| GENERATE A MOVEMENT ANOMALY NOTIFICATION | 450 |

| TRANSMIT THE MOVEMENT ANOMALY NOTIFICATION | 460 |

| EXECUTE ONE OR MORE PROTECTIVE ACTIONS | 470 |

500

RECEIVE A WIRELESS SIGNAL FROM A PLURALITY OF NETWORK DEVICES  —— 510

MEASURE A RECEIVED SIGNAL STRENGTH INDICATOR (RSSI) LEVEL  —— 520

COMPARE THE MEASURED RSSI LEVELS AGAINST A FIRST PREDETERMINED THRESHOLD  —— 530

535
DOES THE RSSI LEVEL EXCEED THE THRESHOLD?

NO

YES

EVALUATE ENVIRONMENTAL SENSORS  —— 540

_800_

RECEIVE WIRELESS SIGNAL FROM NETWORK DEVICES — _810_

MEASURE A RECEIVED SIGNAL STRENGTH INDICATOR (RSSI) LEVEL — _820_

GATHER ENVIRONMENTAL SENSOR DATA — _830_

TRANSMIT THE RSSI LEVEL AND ENVIRONMENTAL SENSOR DATA — _840_

RECEIVE A MOVEMENT ANOMALY NOTIFICATION — _850_

RECEIVE DIRECTION TO EXECUTE ONE OR MORE PROTECTIVE ACTIONS — _860_

EXECUTE ONE OR MORE PROTECTIVE ACTIONS — _860_

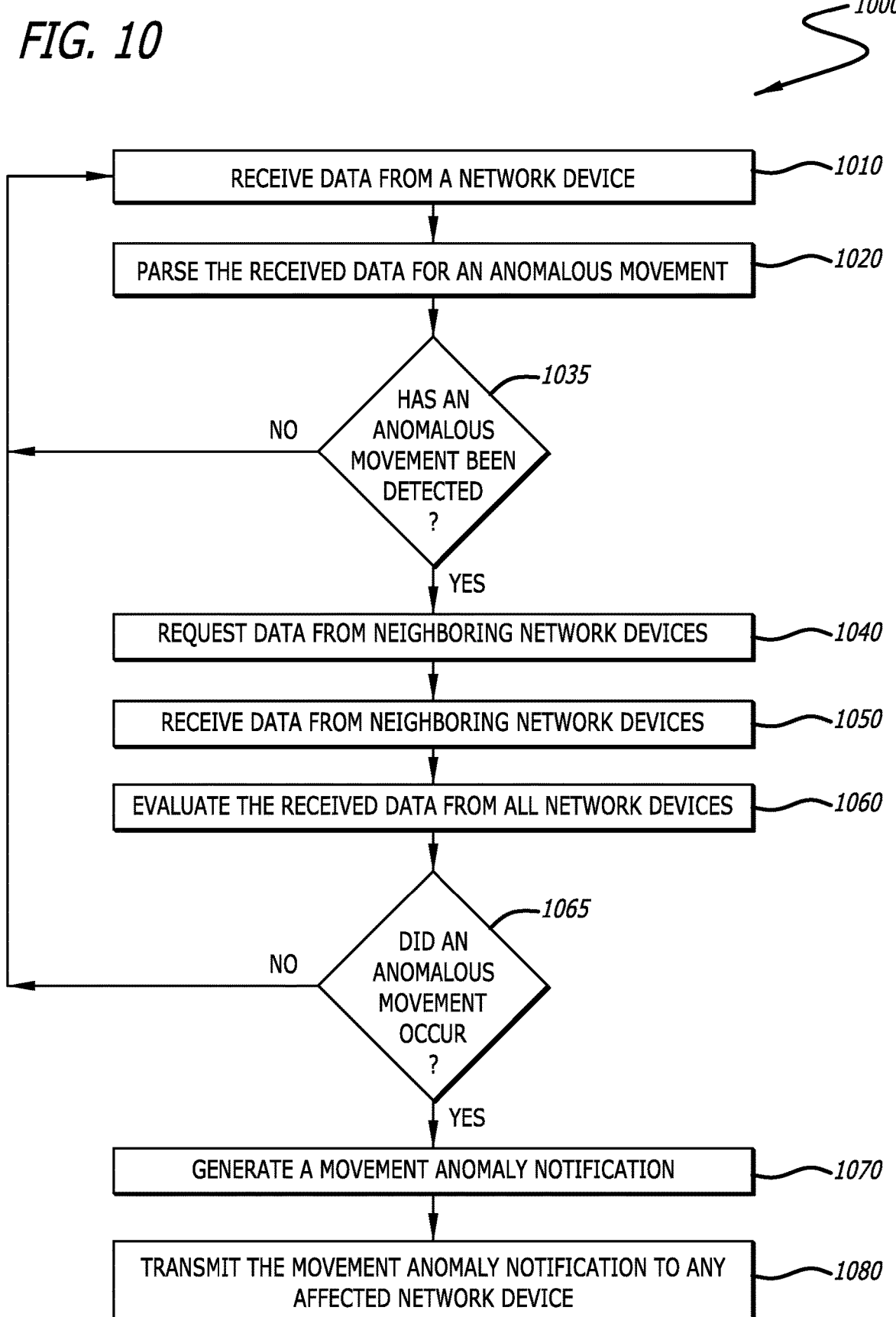

RECEIVE DATA FROM A NETWORK DEVICE ~*1010*

PARSE THE RECEIVED DATA FOR AN ANOMALOUS MOVEMENT ~*1020*

HAS AN ANOMALOUS MOVEMENT BEEN DETECTED ? *1035*

NO

YES

REQUEST DATA FROM NEIGHBORING NETWORK DEVICES ~*1040*

RECEIVE DATA FROM NEIGHBORING NETWORK DEVICES ~*1050*

EVALUATE THE RECEIVED DATA FROM ALL NETWORK DEVICES ~*1060*

DID AN ANOMALOUS MOVEMENT OCCUR ? *1065*

NO

YES

GENERATE A MOVEMENT ANOMALY NOTIFICATION ~*1070*

TRANSMIT THE MOVEMENT ANOMALY NOTIFICATION TO ANY AFFECTED NETWORK DEVICE ~*1080*

NETWORK DEVICE MOVEMENT DETECTION

The present disclosure relates to networking. More particularly, the present disclosure relates to utilizing various signals and sensors to determine if a network device has been physically moved or incapacitated.

BACKGROUND

In various networking deployments, network devices, such as, but not limited to, access points (APs) are often installed at static positions. Once installed, they can stay in that location for several years until a network upgrade occurs, or a survey concludes that some APs need to be moved. In such an environment, any change in the physical position of the installed APs can be considered as a serious anomaly. In some environments (e.g., factory or warehousing), it may happen that an object (forklift, robot, or other moving device) hits an access point, knocking it off its installed position. The networking support team may need to be alerted immediately, because the AP (or its antenna) has lost its correct orientation, causing a potential coverage gap. Wi-Fi has often become business and operation-critical and having network equipment, malfunction, on the ground or ill-configured can lead to problematic issues.

In other environments, such as an office building, the floor topology may change over time (walls added, removed etc.). The APs may then be moved without consideration for the coverage, or the APs may stay at the same position, resulting in coverage gaps that should be addressed immediately. However, the network support team may not always be local to the building and may not be aware of any floor topology changes. In other environments, the movement of an AP is associated with a security threat. Ideally, any changes on the physical location of network devices need to come from network administrators. An unrecognized AP movement can be a sign of either some unknown entity who is tampering with the APs, or is otherwise impersonating the network device.

SUMMARY OF THE DISCLOSURE

Systems and methods for utilizing various signals and sensors to determine if a network device has been physically moved or incapacitated in accordance with embodiments of the disclosure are described herein. In some embodiments, a device includes a processor, at least one network interface controller configured to provide access to a network, and a memory communicatively coupled to the processor, wherein the memory includes a movement detection logic. The logic is configured to receive at least one wireless signal from a second network device, measure a received signal strength indicator (RSSI) level based on the at least one wireless signal, evaluate one or more environmental sensor signals, and determine an anomalous movement of the device based on the one or more environmental sensor signals.

In some embodiments, the RSSI level is compared against a first predetermined threshold.

In some embodiments, the evaluation of the one or more environmental sensor signals are evaluated in response to the RSSI level exceeding the first predetermined threshold.

In some embodiments, the RSSI levels are received from a plurality of external devices.

In some embodiments, the plurality of external devices is stationary at a fixed distance from the device.

In some embodiments, the one or more environmental sensor signals are evaluated over a period of time.

In some embodiments, the evaluation is configured to determine one or more deltas within the one or more environmental sensor signals.

In some embodiments, the determined one or more deltas are compared against a second predetermined threshold.

In some embodiments, the movement detection logic is further configured to generate a movement anomaly notification in response to at least one of the determined one or more deltas exceeded the second predetermined threshold.

In some embodiments, the second predetermined threshold is associated with a profile of acceptable device movements.

In some embodiments, the movement detection logic is further configured to execute one or more protective actions in response to at least one of the determined one or more deltas exceeded the second predetermined threshold.

In some embodiments, the one or more protective actions are at least one of rebooting the device, adjusting one or more settings, or ceasing service to one or more clients.

In some embodiments, a device, includes a processor, at least one network interface controller configured to provide access to a network, and a memory communicatively coupled to the processor, wherein the memory includes a movement detection logic. The logic is configured to receive at least one wireless signal from a second network device, measure a received signal strength indicator (RSSI) level based on the at least one wireless signal, measure one or more environmental sensor signals, transmit the measured environmental sensor signals to an external management device, receive a movement anomaly notification from the external management device, and execute one or more protective actions.

In some embodiments, the transmission further includes the RSSI level associated with the at least one wireless signal.

In some embodiments, the RSSI level is compared against a first predetermined threshold.

In some embodiments, the evaluation of the one or more environmental sensor signals are evaluated in response to the RSSI level exceeding the first predetermined threshold.

In some embodiments, a management device includes a processor, at least one network interface controller configured to provide access to a network, and a memory communicatively coupled to the processor, wherein the memory includes a movement detection logic. The logic is configured to receive one or more environmental sensor signals from a network device, evaluate the received one or more environmental sensor signals, detect an anomalous movement of the network device based on the one or more environmental sensor signals, generate a movement anomaly notification, and transmit the movement anomaly notification to the network device.

In some embodiments, the one or more environmental sensor signals are received and evaluated over a period of time.

In some embodiments, in response to the detection of an anomalous movement, the movement detection logic is further configured to request data from at least one additional network device in proximity to the network device, receive data from the at least one additional network device, evaluate if an anomalous movement is detected in one or more of the at least one additional network device, and detect a multi-device movement anomaly in response to the detection of a similar anomalous movement in the at least one additional network device.

In some embodiments, wherein the movement detection logic is further configured to, in response to a multi-device movement anomaly being detected generate a plurality of protective actions, and transmit the plurality of protective actions to the network devices associated with the multi-device movement anomaly.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 4 is a flowchart depicting a process for detecting and processing movement anomalies in accordance with various embodiments of the disclosure;

FIG. 10 is a flowchart depicting a process for utilizing neighboring network devices for movement detection by a central management system in accordance with various embodiments of the disclosure;

Figure 1:
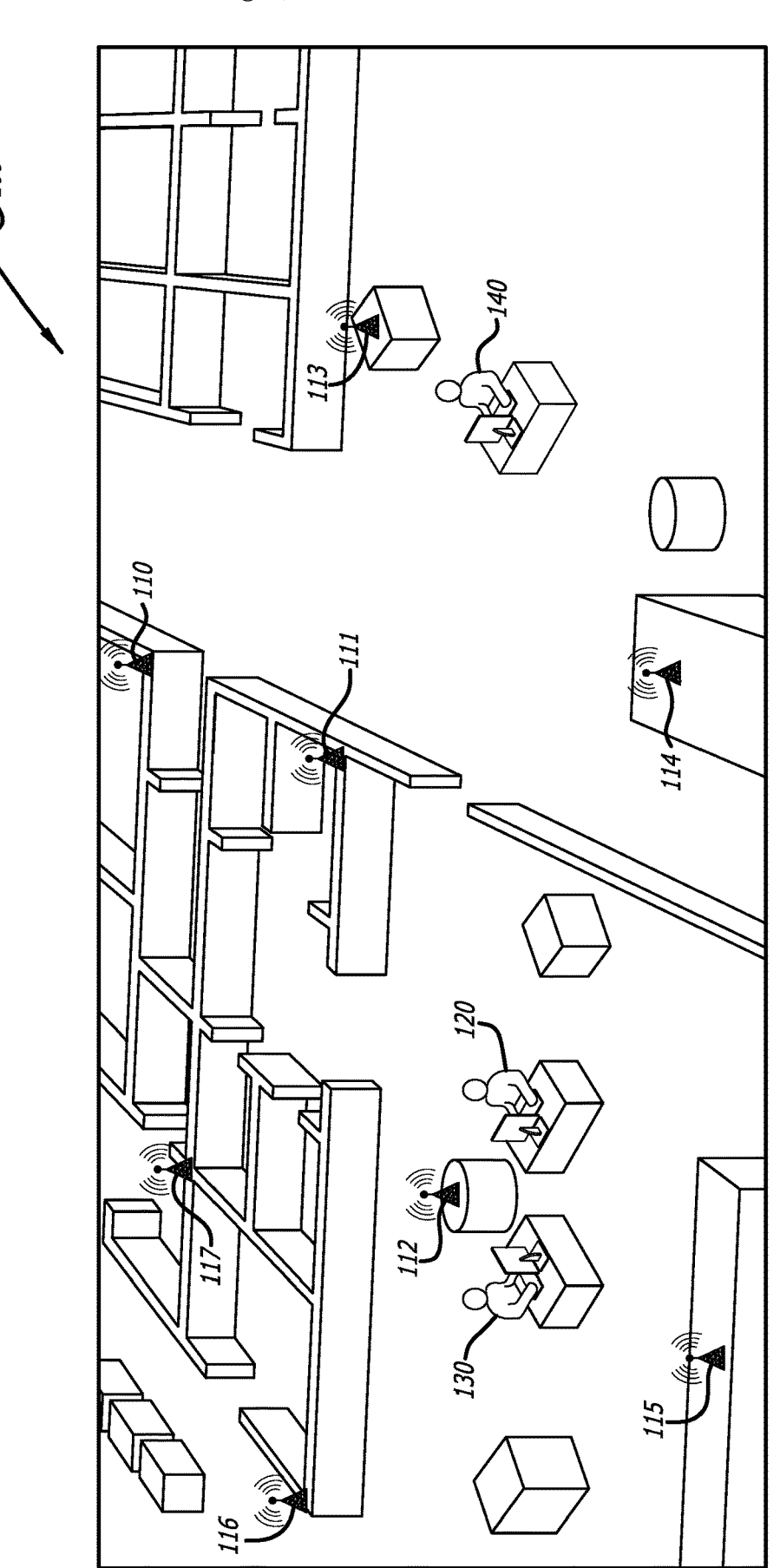
FIG. 1 is a conceptual illustration of a deployment of network devices within a floorplan suitable for management with a movement detection logic in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that can detect movement of various network devices without the need for verification or measurement by a network administrator or engineer. As those skilled in the art will recognize, many deployments of network devices, such as wireless access points (APs), are often deployed to a static or otherwise stationary or fixed location. Upon completion of deployment, the nature of this static configuration can allow for various advantages, such as, but not limited to, ensuring that a given coverage area is sufficiently covered, that the coverage can safely supply service sufficient enough to satisfy one or more service levels agreements (SLAs), provide security when that static location is within a secured area or location, and/or provide a baseline for communication and measurements between the network devices.

However, various situations occur that cause a network device to be moved from their static/fixed position. For example, construction may create new barriers, walls, or other obstructions which can affect the network signals and coverage. During this construction, the network devices may be moved. Likewise, during an environmental event, such as, but not limited to, an earthquake, the deployment area may be damaged or otherwise changed such that one or more of the network devices have moved from their previous static positions. Additionally, security events can occur when a network device, such as an AP, is taken or otherwise moved during a compromising attack. In all of these instances, it would benefit the network administrator to know if a network device has moved and/or to have at least one protective actions taken in result of that movement.

Movement can be detected in a variety of ways. In various embodiments described herein, the network devices are manufactured or otherwise comprise a plurality of environmental sensors that can generate one or more environmental sensor signals. For devices that do not comprise environmental sensors, the environmental signal sensors can be received from an external source such as, but not limited to, a neighboring device within a suitable range, and/or a publicly or privately accessible database.

These environmental sensor signals can be parsed and evaluated such that movement of the device can be detected. In many embodiments, the network devices can determine their relative distance to other network devices (through methods such as Fine Time Measurements (FTM) and Ultra-Wide Band (UWB)). Additionally, a network device can further determine their location via one or more methods such as through the Global Navigation Satellite System (GNSS). By utilizing this related data, the network device can determine if it has been moved.

In further embodiments, the network device measuring the received signal strength indicator (RSSI) levels from wireless signals from at least one additional network device. While certain situations and deployments may not provide for determining movement solely off of RSSI levels, these measurements can be utilized to determine if evaluating the one or more environmental sensor signals is necessary to verify the potential movement.

In additional embodiments, the network device can be configured to record environmental sensor signal data over a time series. As those skilled in the art will recognize, these signal values can change due to environmental factors (e.g., an HVAC unit starts or stops, the air pressure changes, humidity levels, temperature levels, etc.). Often, various embodiments parse and compile the time series data from one or more environmental sensors such that it can be plotted along a curve. Thus, at various intervals, the network device can observe or otherwise evaluate the signal values deltas such that it can be compared to previous, known events. One or more machine learning methods can be utilized to analyze these events and/or patterns to determine if a given set of sensor data inputs is anomalous or not. In other words, the network device can be associated with a given "profile" of known or otherwise acceptable movements. Should it be determined that a detected move is outside that profile, then it can be determined that an anomalous movement has occurred.

In more embodiments, the detection of an anomalous movement of a network device can result in a variety of actions. In some embodiments, a movement anomaly notification can be generated and sent to one or more network administrators. These movement anomaly notifications can be configured to be read by a person but may be formatted and transmitted to another network device to execute one or more protective actions. In still more embodiments, the one or more protective actions can include, but are not limited to, rebooting the network device, adjusting one or more settings, or ceasing service to one or more clients.

In a number of embodiments, a plurality of neighboring network devices can be pinged or otherwise communicated with to further assess if an anomalous movement has occurred. For example, if a network device has detected a change in the RSSI levels sufficient to warrant evaluation of one or more environmental sensor signals, an additional step of transmitting a request to known neighboring devices can be made such that the request is configured to ask for that device's environmental sensor data or if it has also been triggered to evaluate such signals, etc. This data may also be utilized as input into one or more machine learning modules to determine if an anomalous movement has occurred.

In still more embodiments, the detection is performed by, at least in part, a centralized management system (CMS) which can be an additional device within the network or a cloud-based remote service, etc. This can be configured to compliment or supplement the local network device detection or to completely supplant it, based on the application desired. In certain embodiments, the network device can report, broadcast, or otherwise transmit data to the CMS which can evaluate the data, such as utilizing one or more machine learning processes, to make a determination on anomalous movement. This determination can be sent back to the network device which can then execute one or more protective actions in response. In some embodiments, the CMS may also determine what protective action(s) to take and instruct the network device to execute them. In more embodiments, the network device may not have access to environmental sensors and/or neighboring devices. For these instances, the CMS can receive the network device data, and ping the neighboring devices for local environmental data to make a determination of anomalous movement. In this way, one or more legacy devices can be utilized within a network where anomalous movement detection is desired at the network device level.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a deployment of network devices within a floorplan suitable for management with a movement detection logic in accordance with various embodiments of the disclosure is shown. In many embodiments, a floorplan 100 can be selected for determining anomalous movements of various network devices. In the embodiment depicted in FIG. 1, the network devices are access points. Although the floorplan 100 depicted in the embodiment of FIG. 1 is an office environment, it is contemplated that a floorplan may be any environment that includes a plurality of network devices distributed throughout an area. In additional embodiments, an area may have multiple floorplans and network devices, such as access points, may be associated with multiple floorplans. Indeed, in certain embodiments, a floorplan may be defined as a collection of network devices and the area that those network devices cover.

In the embodiment depicted in FIG. 1, the floorplan 100 has a first access point 110 at an entranceway to the area. Likewise, a second access point 111 can be placed centrally within the floorplan 100. Within the floorplan 100, three people are depicted working at desk workstations. The first person 120 and second person 130 are working next to a third access point 112. A third person 140 is working next to a fourth access point 113. Additional access points are distributed throughout the floorplan 100 to provide additional wireless signal coverage including a fifth access point 114, a sixth access point 115, a seventh access point 116, and an eighth access point 117. As those skilled in the art will recognize, the first person 120 and second person 130 may have their network connection needs fully met by the third access point 112. Similarly, the third person 140 may be fully served by the connection provided by the fourth access point 113.

In a number of embodiments, one or more of the access points 110-117 can be equipped with a plurality of environmental sensors. These environmental sensors can include, but are not limited to, temperature sensors, humidity sensors, light sensors (photodetectors), infrared sensors, ultraviolet sensors, gas sensors, sound sensors, pressure sensors, proximity sensors, water quality sensors, soil moisture sensors, motion sensors, carbon dioxide sensors, radar sensors, and/or smoke and fire sensors. Any number or combination of these sensors may be utilized within various network devices as needed to satisfy the desired application.

Although a specific embodiment for a conceptual illustration of a deployment of network devices within a floorplan suitable for management with a movement detection logic in accordance with various embodiments of the disclosure is discussed with respect to FIG. 1, any of a variety of systems and/or processes may be utilized in accordance with embodiments of the disclosure. For example, the device, controller, or logic may be a specialized device within the network or operated by a network administrator remotely from the deployed environment. In certain embodiments, the device, controller, or logic may be a logic that is operated or distributed through the access points of the network. The elements depicted in FIG. 1 may also be interchangeable with other elements of FIGS. 2-11 as required to realize a particularly desired embodiment.

Figure 2:
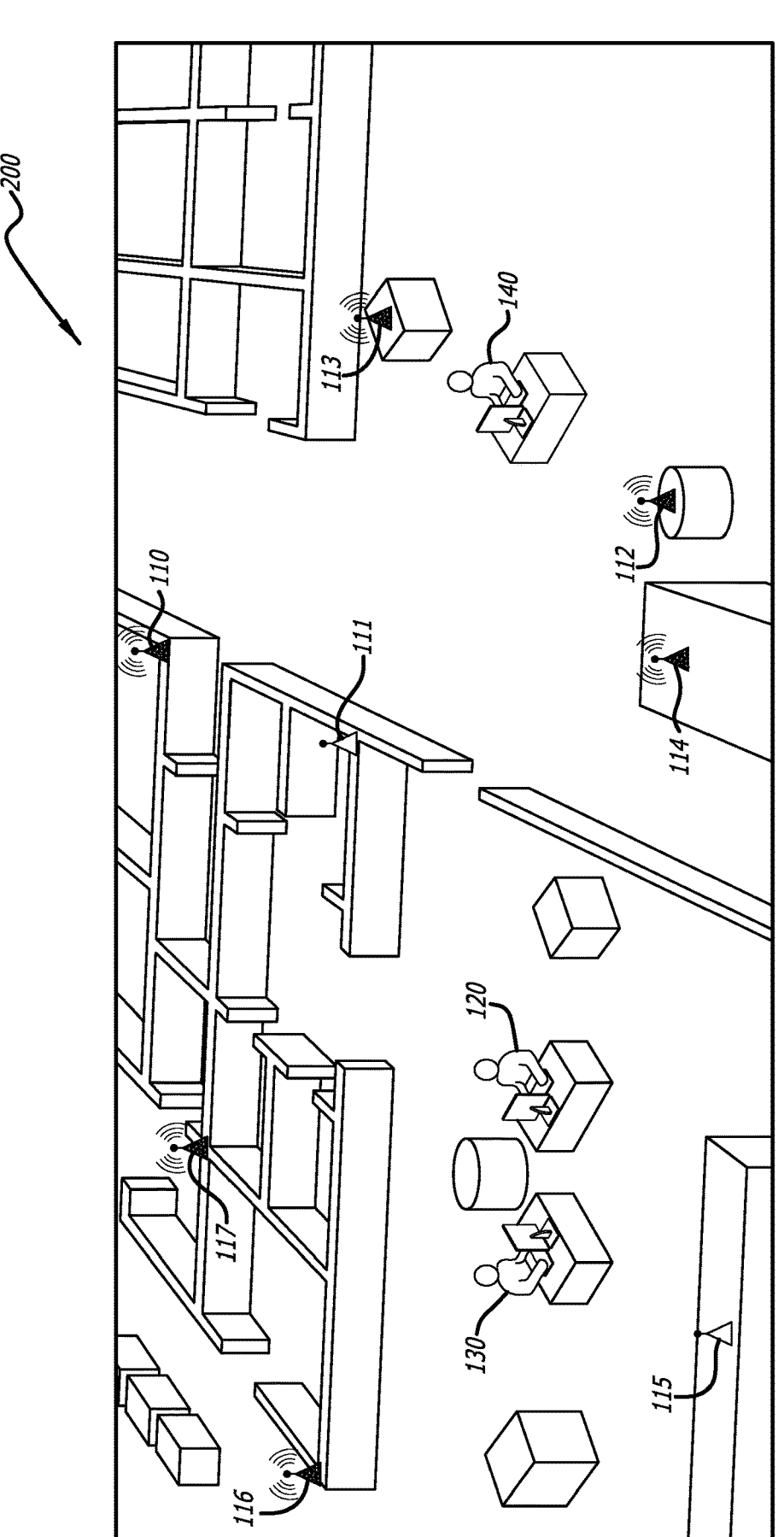
FIG. 2 is a conceptual illustration of a deployment of network devices within a floorplan after one or more movement anomalies have occurred in accordance with various embodiments of the disclosure.

Referring to FIG. 2, a conceptual illustration of a deployment of network devices within a floorplan after one or more movement anomalies have occurred in accordance with various embodiments of the disclosure is shown. Similar to the embodiments depicted in FIG. 1, a floorplan 200 can be configured with different access points to provide wireless network coverage over a large area within the floorplan. In additional embodiments, those access points may be further configured to provide network coverage at various frequency bands. These frequency bands can often be generated by utilizing a specialized transceiver that is configured to transmit and/or receive wireless network signals at a particular frequency band. In various embodiments, the frequency bands may include 2.4 GHz, 5 GHZ, and/or 6 GHz signals. However, it is contemplated that any frequency band may be utilized as necessary to allow for the transmission of wireless networking signals. In some embodiments, the transceivers may be configured to transmit over multiple frequency bands or may be tuned to direct signals to a portion of the floorplan 200.

In the embodiment depicted in FIG. 2, the floorplan 200 is configured with a first access point 110, and a second access point 111 which can be placed centrally within the floorplan 100. The first person 120 and second person 130 are working next to a third access point 112. A third person 140 is working next to a fourth access point 113. Additional access points are distributed throughout the floorplan 200 to provide additional wireless signal coverage including a fifth access point 114, a sixth access point 115, a seventh access point 116, and an eighth access point 117.

As those skilled in the art will recognize, the various access points 110-117 are deployed in a static or otherwise fixed manner such that, once deployed, they are expected to stay in those positions indefinitely. However, various movement events may occur that can cause an otherwise static network device to move in an unexpected, or anomalous manner. Typically, construction may cause such movement as the network devices are moved to accommodate new structures, layouts, etc. Another source of movement may be from an attack on the network. In order to gain unauthorized access to the network, a network device may be compromised such that it requires physical access. Gaining this physical access can often require taking or moving the network device. Other events, such as catastrophic events (earthquake, flood, landslide, tornado, etc.) may cause movement, as well as incomplete or failing network device fixation to the static location during installation.

The embodiment depicted in FIG. 2 is meant to show the layout of access point network devices after or during construction. As a result of the construction, the third access point 112 has been moved from the left side of the floorplan 200 to the right side, next to the fifth access point 114. Additionally, the third access point 112 and the sixth access point 115 have had their power interrupted. As a result, the first person 120 and second person 130 may not have sufficient network coverage with this new layout, which is something that a network administrator often desires to know. Because network administrators may be remotely located, and not notified of upcoming construction, a determination and notification of anomalous movements can improve the administration of the network by making the network administrator aware of the movement, which can trigger the execution of one or more protective actions. In the case of the embodiment depicted in FIG. 2, the network administrator may increase the power output of other nearby functional access points (e.g., the seventh access point 116) as a stopgap until a work order is placed to add or move another access point closer to the first person 120 and second person 130.

Although a specific embodiment of a deployment of network devices within a floorplan after one or more movement anomalies have occurred is described above with respect to FIG. 2, any of a variety of systems and/or processes may be utilized in accordance with embodiments of the disclosure. For example, the access points may evaluate potential movements in response to a triggering event or periodically based on a predefined interval of time. The aspects described in FIG. 2 may also be interchangeable with other elements of FIGS. 1 and 3-11 as required to realize a particularly desired embodiment.

Figure 3:
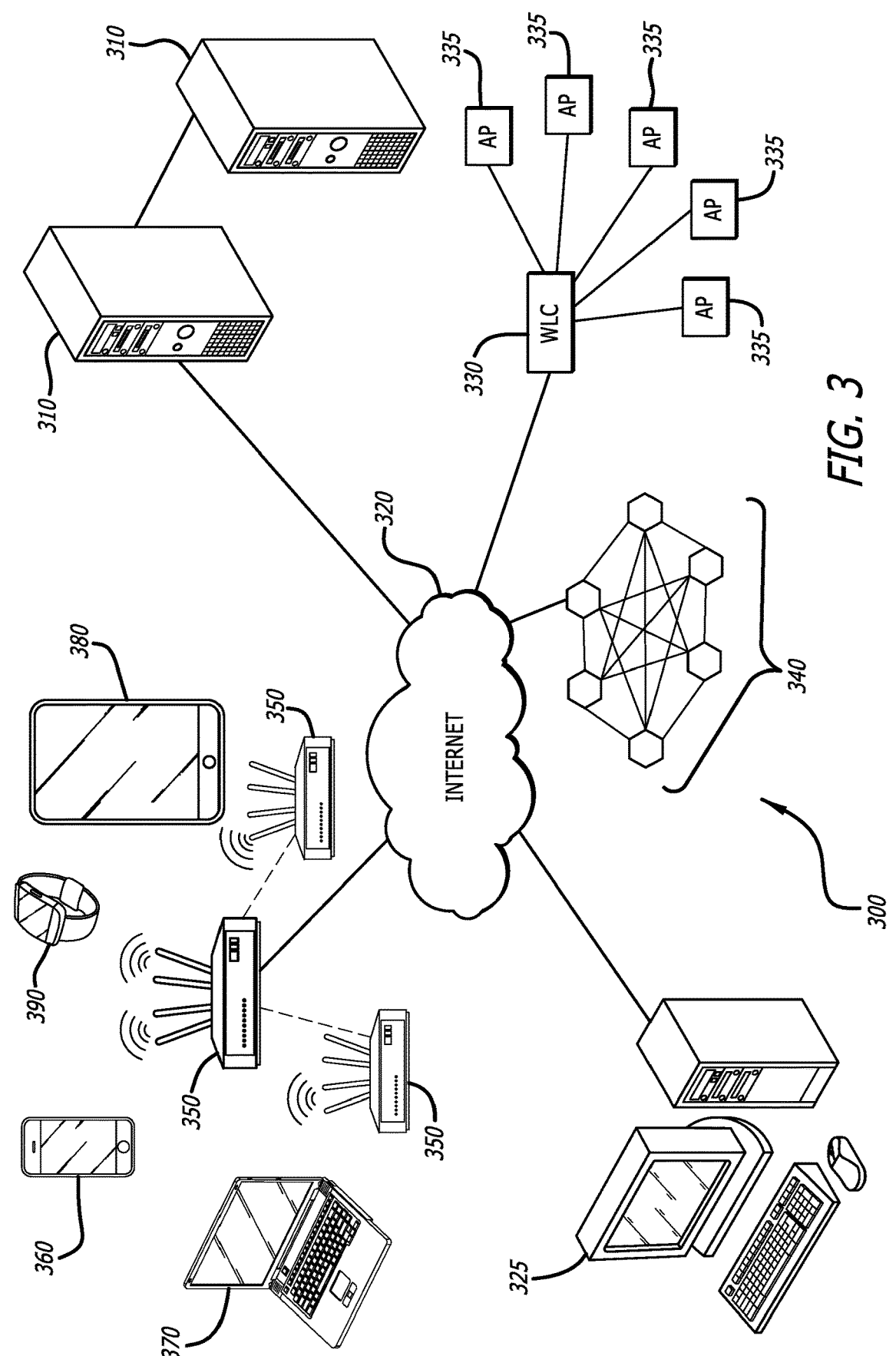
FIG. 3 is a conceptual network diagram of various environments that a movement detection logic may operate within in accordance with various embodiments of the disclosure in accordance with various embodiments of the disclosure.

Referring to FIG. 3, a conceptual network diagram of various environments that a movement detection logic may operate within in accordance with various embodiments of the disclosure in accordance with various embodiments of the disclosure is shown. Those skilled in the art will recognize that a movement detection logic can be comprised of various hardware and/or software deployments and can be configured in a variety of ways. In some non-limiting examples, the movement detection logic can be configured as a standalone device, exist as a logic within another network device, be distributed among various network devices operating in tandem, or remotely operated as part of a cloud-based network management tool.

In many embodiments, the network 300 may comprise a plurality of devices that are configured to transmit and receive data for a plurality of clients. In various embodiments, cloud-based centralized management servers 310 are connected to a wide-area network such as, for example, the Internet 320. In further embodiments, cloud-based centralized management servers 310 can be configured with or otherwise operate a movement detection logic. The movement detection logic can be provided as a cloud-based service that can service remote networks, such as, but not limited to the deployed network 340. In these embodiments, the movement detection logic can be a logic that receives data from the deployed network 340 and generates predictions, receives environmental sensor signal data, and perhaps automates certain decisions or protective actions associated with the network devices. In certain embodiments, the movement detection logic can generate historical and/or algorithmic data in various embodiments and transmit that back to one or more network devices within the deployed network 340.

However, in additional embodiments, the movement detection logic may be operated as distributed logic across multiple network devices. In the embodiment depicted in FIG. 3, a plurality of network access points (APs) 350 can operate as a movement detection logic in a distributed manner or may have one specific device facilitate the detection of movement for the various APs. This can be done to provide sufficient needs to the network of APs such that, for example, a minimum bandwidth capacity may be available to various devices. These devices may include but are not limited to mobile computing devices including laptop computers 370, cellular phones 360, portable tablet computers 380 and wearable computing devices 390.

In still further embodiments, the movement detection logic may be integrated within another network device. In the embodiment depicted in FIG. 3, the wireless LAN controller 330 may have an integrated movement detection logic that it can use to generate predictions, and perhaps detect anomalous movements regarding the various APs 335 that it is connected to, either wired or wirelessly. In this way, the APs 335 can be configured such that they can read and report various signal levels and environmental sensor signals to the WLC 330. In still more embodiments, a personal computer 325 may be utilized to access and/or manage various aspects of the movement detection logic, either remotely or within the network itself. In the embodiment depicted in FIG. 3, the personal computer 325 communicates over the Internet 320 and can access the movement detection logic within the cloud based centralized management servers 310, the network APs 350, or the WLC 330 to modify or otherwise monitor the movement detection logic.

Although a specific embodiment for a conceptual network diagram of a various environments that a movement detection logic operating on a plurality of network devices suitable for carrying out the various steps, processes, methods, and operations described herein is discussed with respect to FIG. 3, any of a variety of systems and/or processes may be utilized in accordance with embodiments of the disclosure. For example, the movement detection logic may be implemented across a variety of the systems described herein such that some detections are generated on a first system type (e.g., remotely), while additional detection steps or protection actions are generated or determined in a second system type (e.g., locally). The elements depicted in FIG. 3 may also be interchangeable with other elements of FIGS. 1-2, and 4-11 as required to realize a particularly desired embodiment.

Referring to FIG. 4, a flowchart depicting a process 400 for detecting and processing movement anomalies in accordance with various embodiments of the disclosure is shown. In many embodiments, the process 400 can receive wireless signals from a plurality of network devices (block 410). The wireless signals can be transmitted directly or may be broadcast such that they are available to receive. In certain embodiments, the wireless signals are received over a series of time.

In more embodiments, the process 400 can measure a received signal strength indicator (RSSI) level (block 420). As those skilled in the art will recognize, RSSI is a crucial metric used to quantify the strength of a received wireless signal, typically in wireless communication technologies like Wi-Fi, Bluetooth, and cellular networks. Represented as a numerical value, usually in dBm (decibels relative to milliwatts), RSSI provides a clear indication of how strong or weak a received radio signal is at a specific location or on a particular wireless network device. A higher RSSI value generally signifies a stronger signal, indicating better connection quality and lower chances of signal dropout or packet loss in Wi-Fi networks, for instance. RSSI is widely used for tasks such as wireless site surveys to optimize access point placement and assess network coverage. Other factors like signal quality and interference levels may also play significant roles in determining overall network quality.

In a number of embodiments, the process 400 can evaluate one or more environmental sensors (block 430). As discussed above, various network devices may be configured with a plurality of environmental sensors that can take readings and generate signals which can be parsed or otherwise formatted as environmental sensor signal data for processing in various steps, such as an input into one or more machine learning processes. Environmental sensors can include, but are not limited to, temperature sensors, humidity sensors, light sensors (photodetectors), infrared sensors, ultraviolet sensors, gas sensors, sound sensors, pressure sensors, proximity sensors, water quality sensors, soil moisture sensors, motion sensors, carbon dioxide sensors, radar sensors, and/or smoke and fire sensors. Any number or combination of these sensors may be utilized within various network devices as needed to satisfy the desired application.

In various embodiments, the process 400 can determine an anomalous movement (block 440). As described in more detail below, network devices can move or have changes in environmental sensor signal data that are within normal operating parameters. However, in some embodiments, by evaluating available RSSI levels, as well as environmental sensor signal data, the process 600 can determine if a detected movement was anomalous, meaning that it falls outside the bounds of normal or allowed operating parameters. In certain embodiments, this determination can be accomplished via one or more machine learning processes. In still more embodiments, the detection can be done remotely or on a device that receives the available data.

In additional embodiments, the process 400 can generate a movement anomaly notification (block 450). In some embodiments, the movement anomaly notification can be a signal that is sent to another process to execute one or more actions in response. In certain embodiments, the movement anomaly notification is formatted for transmission to a network administrator or other remote device.

In further optional embodiments, the process 400 can transmit the movement anomaly notification. As discussed above, the movement anomaly notification can be formatted for transmission to a network administrator or to an external device for further processing. In some embodiments, the transmission is directly to the desire destination target. In additional embodiments, the transmission is configured as a broadcast such that a variety of network devices may capture or otherwise receive the data.

In more additional optional embodiments, the process 400 can execute one or more protective actions (block 470). As discussed above protective actions can be executed in response to a detected anomalous movement of the network device. This can include rebooting the device, limiting access or features, and/or changing one or more configurations. This can be done to prevent an authorized attack but may be configured to maximize the potential to provide service from the device, even if a movement or catastrophic event occurs.

Although a specific embodiment for a process for detecting and processing movement anomalies suitable for carrying out the various steps, processes, methods, and operations described herein is discussed with respect to FIG. 4, any of a variety of systems and/or processes may be utilized in accordance with embodiments of the disclosure. For example, the optional steps depicted do not imply that the remaining steps are required. Indeed, any variety of steps or order can be utilized in order to satisfy the desired application. The elements depicted in FIG. 4 may also be interchangeable with other elements of FIGS. 1-3 and 5-11 as required to realize a particularly desired embodiment.

Figure 5:
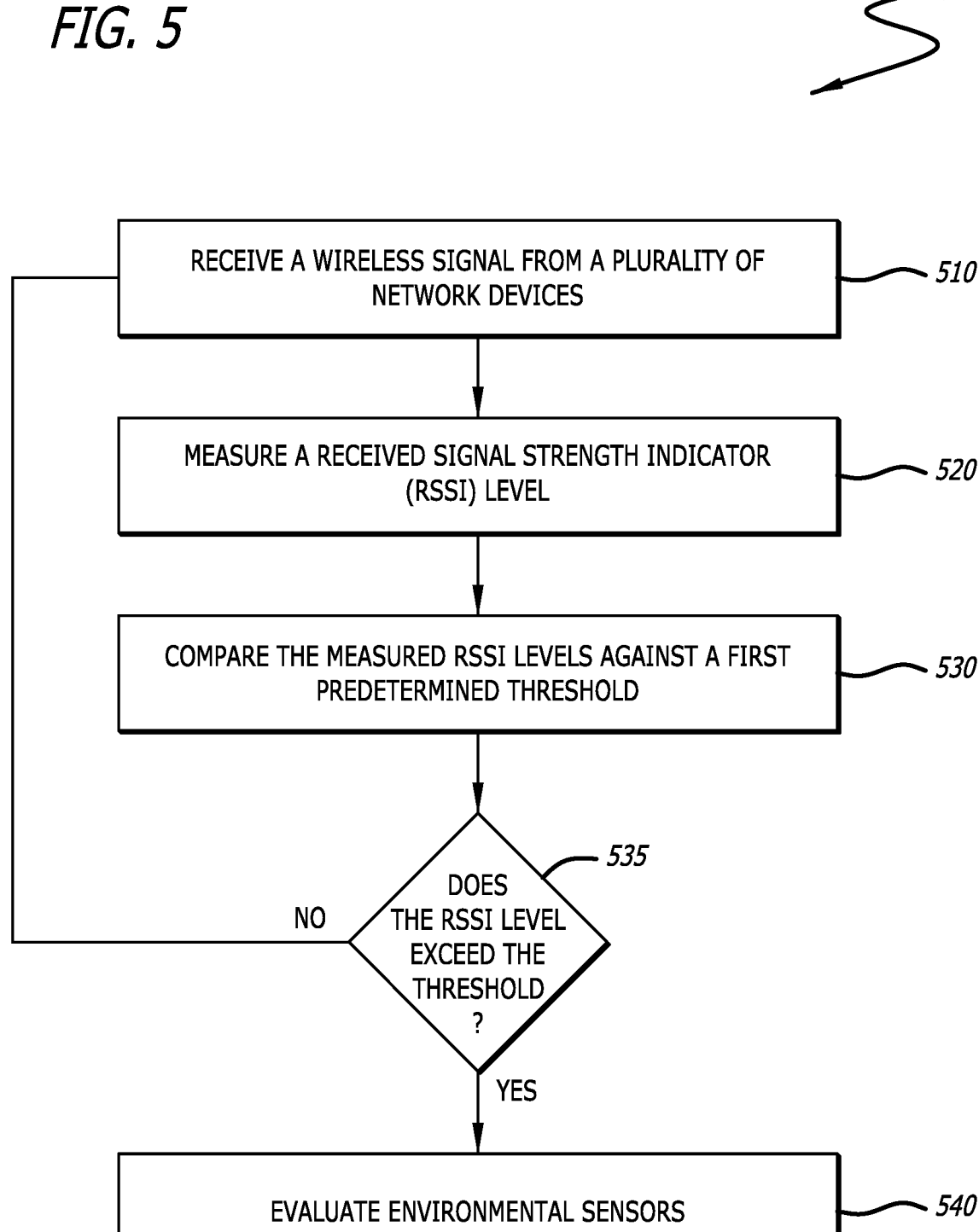
FIG. 5 is a flowchart depicting a process for evaluating data associated with movement of a network device in accordance with various embodiments of the disclosure.

Referring to FIG. 5, a flowchart depicting a process 500 for evaluating data associated with movement of a network device in accordance with various embodiments of the disclosure is shown. In many embodiments, the process 500 can receive a wireless signal from a plurality of network devices (block 510). In some embodiments, a central management system (CMS) can be configured to receive the wireless signals. In certain embodiments, the process 500 can receive the wireless signals as a direct transmissions or as part of a broadcast.

In a number of embodiments, the process 500 can measure a received signal strength indicator (RSSI) level (block 520). As discussed above, a higher RSSI value generally signifies a stronger signal, indicating better connection quality and lower chances of signal dropout or packet loss in Wi-Fi networks, for instance. This measurement can be done locally within the network device; however, certain embodiments may transmit the wireless signals to an external device for measuring of the RSSI levels.

In more embodiments, the process 500 can compare the measured RSSI levels against a first predetermined threshold (block 530). In some embodiments, the first predetermined threshold is a static threshold configured during manufacture of the network device or manually set by a network administrator. In certain embodiments, the first predetermined threshold can be a dynamic threshold that is configured or otherwise responsive to one or more inputs. These inputs can be related to the current conditions, a service level agreement (SLA), and/or data received from an external device. However, it is contemplated that any suitable input may be utilized to dynamically change the first predetermined threshold as needed for the desired application. In additional embodiments, the first predetermined threshold may be a profile of what levels or change in levels over time are considered "normal" or within an acceptable range.

In more embodiments, the process 500 can determine if the RSSI level exceeds the first predetermined threshold (block 535). In certain embodiments, this determination can be a direct comparison of values. In further embodiments, the determination may be as an output of one or more machine learning processes, where the RSSI levels are one of the inputs. In response to the RSSI level not exceeding the first predetermined threshold, the process 500 can again be configured to receive a wireless signal from a plurality of network devices (block 510).

However, when the RSSI level does exceed the first predetermined threshold, numerous embodiments of the process 500 can evaluate one or more environmental sensors (block 540). As discussed above, the environmental sensors can be disposed on or within a network device, or may be located externally and are pinged or otherwise accessed. In certain embodiments, the environmental sensors are generating signals and corresponding data, and the process 500 simply reads the stream of data for a given period of time.

Although a specific embodiment for evaluating data associated with movement of a network device suitable for carrying out the various steps, processes, methods, and operations described herein is discussed with respect to FIG. 5, any of a variety of systems and/or processes may be utilized in accordance with embodiments of the disclosure. For example, the evaluating of the environmental sensors and related signals/data may be performed in tandem with the RSSI level evaluations. The elements depicted in FIG. 5 may also be interchangeable with other elements of FIGS. 1-4 and 6-11 as required to realize a particularly desired embodiment.

Figure 6:
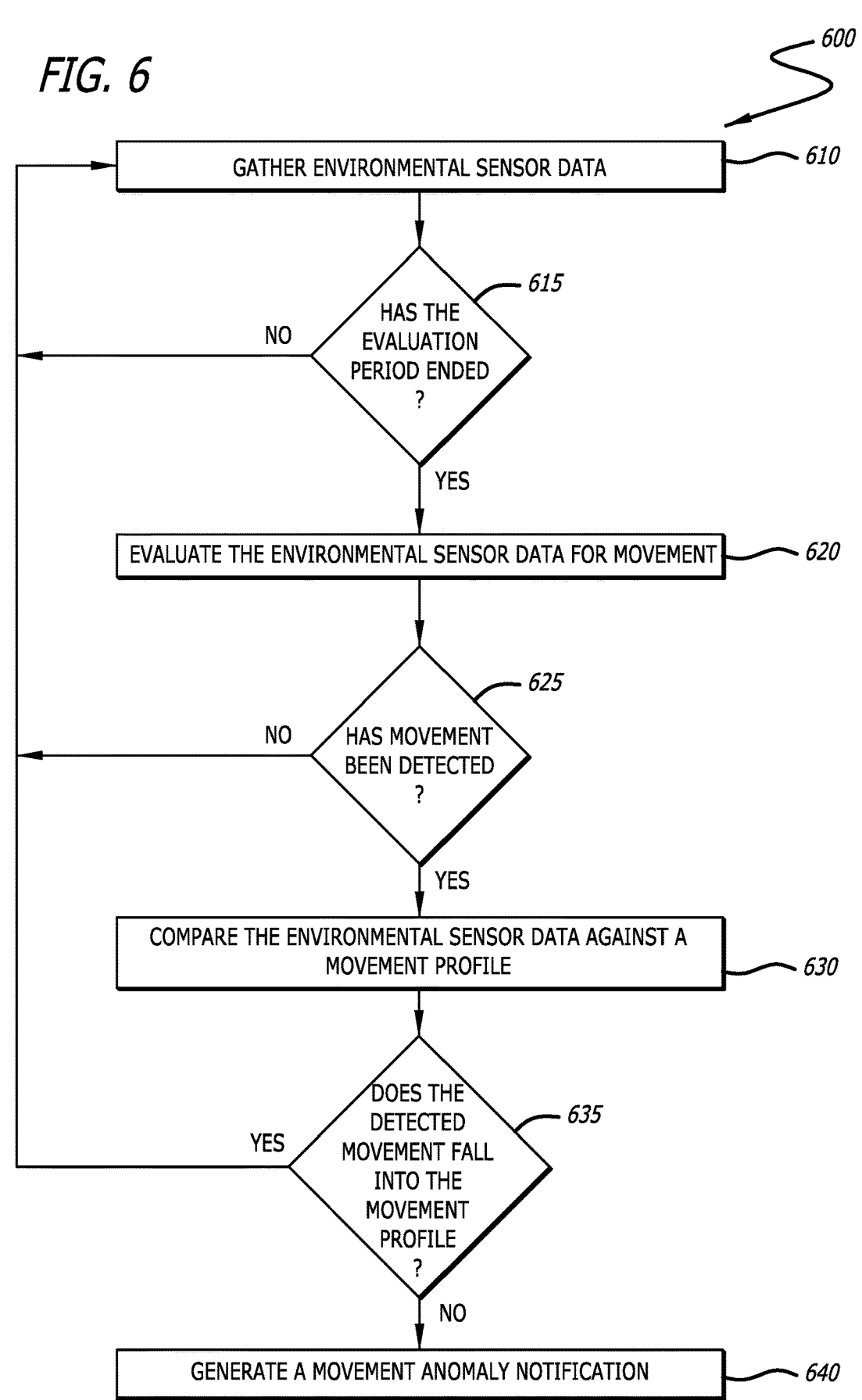
FIG. 6 is a flowchart depicting a process for processing time series data against a movement profile in accordance with various embodiments of the disclosure.

Referring to FIG. 6, a flowchart depicting a process 600 for processing time series data against a movement profile in accordance with various embodiments of the disclosure is shown. In many embodiments, the process 600 can gather environmental sensor data (block 610). As discussed above, certain embodiments may gather the data by retrieving it as a request to one or more environmental sensors. Additional embodiments may gather the data by accessing it on an external device, data stream, or database. This gathering of environmental sensor data can occur over a period of time. This can occur during an evaluation window or other time series method.

In a number of embodiments, the process 600 can determine if the evaluation period has ended (block 615). This determination can be made based off of a particular number of samples, data, or other measurements taken. This can be done more easily when the environmental sensors are configured to take measurements or otherwise generate data at a fixed periodic interval of time. When the evaluation period has not ended, the process 600 can continue to gather environmental sensor data (block 610).

However, in response to the evaluation period ending, various embodiments can evaluate the environmental sensor data for movement (block 620). This detection can be in response to evaluating the time series data to one or more profiles. In some embodiments, the movement profile can comprise a rate of deltas or velocity of change of the environmental sensor data. In certain embodiments, the profile may change dynamically in response to one or more inputs, such as, but not limited to, time of day, data traffic levels, SLAs, and/or historical measurements.

In many embodiments, the process 600 can determine of movement has been detected (block 625). In various embodiments, the detection can be based on an evaluation off of time series data captured form the environmental sensors. In additional embodiments, the detection can evaluate a delta or velocity of change in signal that exceeds a second predetermined threshold. If no movement is detected, the process 600 can continue to gather environmental sensor data (block 610).

However, in response to the process 600 detecting movement, certain embodiments may compare the environmental sensor data against a movement profile (block 630). As discussed above, the profile may have a variety of measurements or combinations of measurements that have an associated minimum and maximum values. In some embodiments, the comparison is to determine if one or more values fall within that range. However, additional comparisons may be done if there is a unique combination of sensor data that indicates movement. In similar embodiments, the environmental sensor data may be tallied as a score to compare against the profile.

In still more embodiments, the process 600 can determine if the detected movement falls into the movement profile (block 640). As discussed above, a movement profile may be generated for each network device. The movement profile may be created at manufacture, manually set by the network administrator, or vary based on one or more machine learning processes and/or heuristics. In some embodiments, if the detected movement does fall within the movement profile, the move is considered non-anomalous and the process 600 can continue to gather environmental sensor data (block 610).

However, in response to the detected movement falling outside of the movement profile, the process 600 can in numerous embodiments, generate a movement anomaly notification (block 640). In some embodiments, the movement anomaly notification can be a signal sent to another process/logic/device that can subsequently execute a protective action. In certain embodiments, the movement anomaly notification can be transmitted to a network administrator for review.

Although a specific embodiment for processing time series data against a movement profile suitable for carrying out the various steps, processes, methods, and operations described herein is discussed with respect to FIG. 6, any of a variety of systems and/or processes may be utilized in accordance with embodiments of the disclosure. For example, the process can utilize different profiles for different types of environmental changes. In some embodiments, the movement profiles are adjusted based on one or more historical conditions and/or neighboring device conditions. The elements depicted in FIG. 6 may also be interchangeable with other elements of FIGS. 1-5 and 7-11 as required to realize a particularly desired embodiment.

Figure 7:
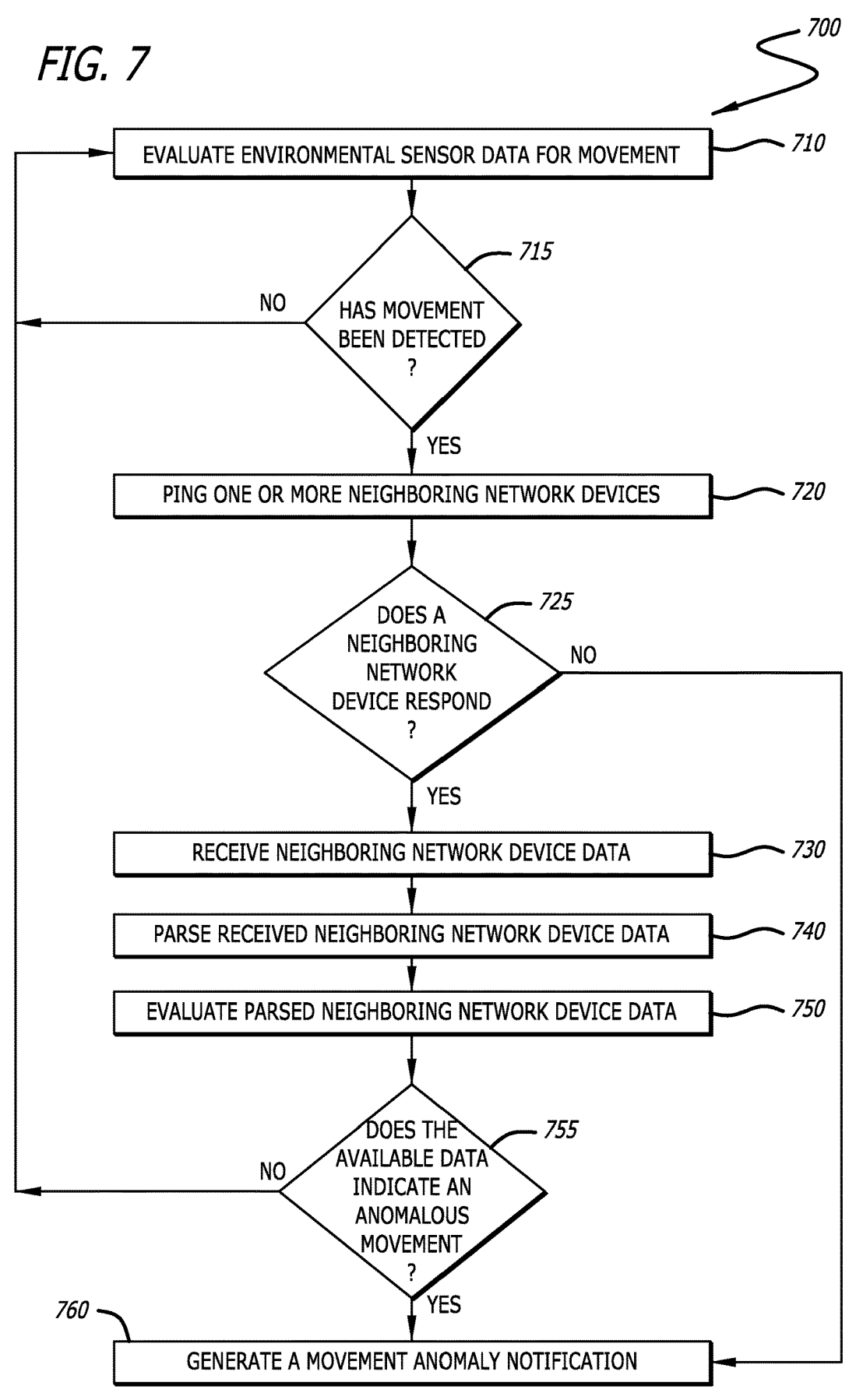
FIG. 7 is a flowchart depicting a process for utilizing neighboring devices for movement detection in accordance with various embodiments of the disclosure.

Referring to FIG. 7, a flowchart depicting a process for utilizing neighboring devices for movement detection in accordance with various embodiments of the disclosure is shown. In many embodiments, the process 700 can evaluate environmental sensor data for movement (block 710). As discussed above, the environmental sensor data can be accessed via a direct signal data input, or may be gathered from one or more external devices, management systems, and/or databases.

In response to evaluating the environmental sensor data, the process 700 can in various embodiments, determine if movement has been detected (block 715). Methods for determining movement are discussed above, but may include comparing the environmental sensor data to one or more thresholds or profile ranges. In response to no movement being detected, the process 700 can continue to evaluate environmental sensor data for movement (block 710).

However, in response to movement being detected, certain embodiments of the process 700 can ping one or more neighboring network devices (block 720). This ping can be done by a device or can be coordinated by a centralized management service (CMS). In some embodiments, the process 700 may simply access publicly available data or data that is broadcast out to multiple devices to acquire and process.

In a number of embodiments, the process 700 can determine if the neighboring network device responds (block 725). As those skilled in the art will recognize, in response to certain movement events, such as catastrophic events, a number of network devices may be knocked offline at once. Thus, in certain embodiments, the process 700 can interpret the lack of response as an event that is anomalous and therefore generate a movement anomaly notification (block 760).

However, in numerous embodiments, the process 700 can be configured to receive neighboring network device data (block 730). This reception can be in response to a direct request for data, or may be received from accessing a database or other data store. In some embodiments, the receiving of data can be part of a protocol where data is shared routinely or at given intervals of time.

In more embodiments, the process can parse the received neighboring network device data (block 740). As those skilled in the art will recognize, data can be provided in numerous different formats and can require parsing to prepare or otherwise change the data into a format that can be further processed. In some embodiments, the neighboring network device data may be formatted in a method that does not require parsing. Furthermore, parsing may include processing the data packets received from the neighboring devices into environmental sensor data, time series data, or other data.

In further embodiments, the process 700 evaluate the parsed neighboring network device data (block 750). The neighboring device data can be any variety of data requested. In certain embodiments, the neighboring network device data can be environmental sensor data associated with one or more neighboring devices. In additional embodiments, the neighboring network device data can be queries on statuses or functional/operational states.

In a variety of embodiments, the process 700 can determine if the available data indicates an anomalous movement (block 755). As indicated above, the process 700 may have various types of data available for processing to make this determination. The determination may, for example, be based on a set of heuristics or may utilize the various data types as inputs into one or more machine learning processes.

If the process 700 determines that an anomalous movement has not occurred, the process 700 can evaluate environmental sensor data for movement (block 710).

However, when the process 700 determines that an anomalous movement has occurred, various embodiments can generate a movement anomaly detection notification (block 760). As discussed above, the movement anomaly detection notification can be transmitted to a network administrator or can be utilized as a signal that triggers one or more protective actions. These protective actions can be triggered locally or remotely based on the application and/or protective action desired.

Although a specific embodiment for utilizing neighboring devices for movement detection suitable for carrying out the various steps, processes, methods, and operations described herein is discussed with respect to FIG. 7, any of a variety of systems and/or processes may be utilized in accordance with embodiments of the disclosure. For example, the neighboring network devices may have their received data prioritized by time (more recent data has higher ranking) and proximity ranking (closer network devices are ranked higher than farther devices). The elements depicted in FIG. 7 may also be interchangeable with other elements of FIGS. 1-6 and 8-11 as required to realize a particularly desired embodiment.

Figure 8:
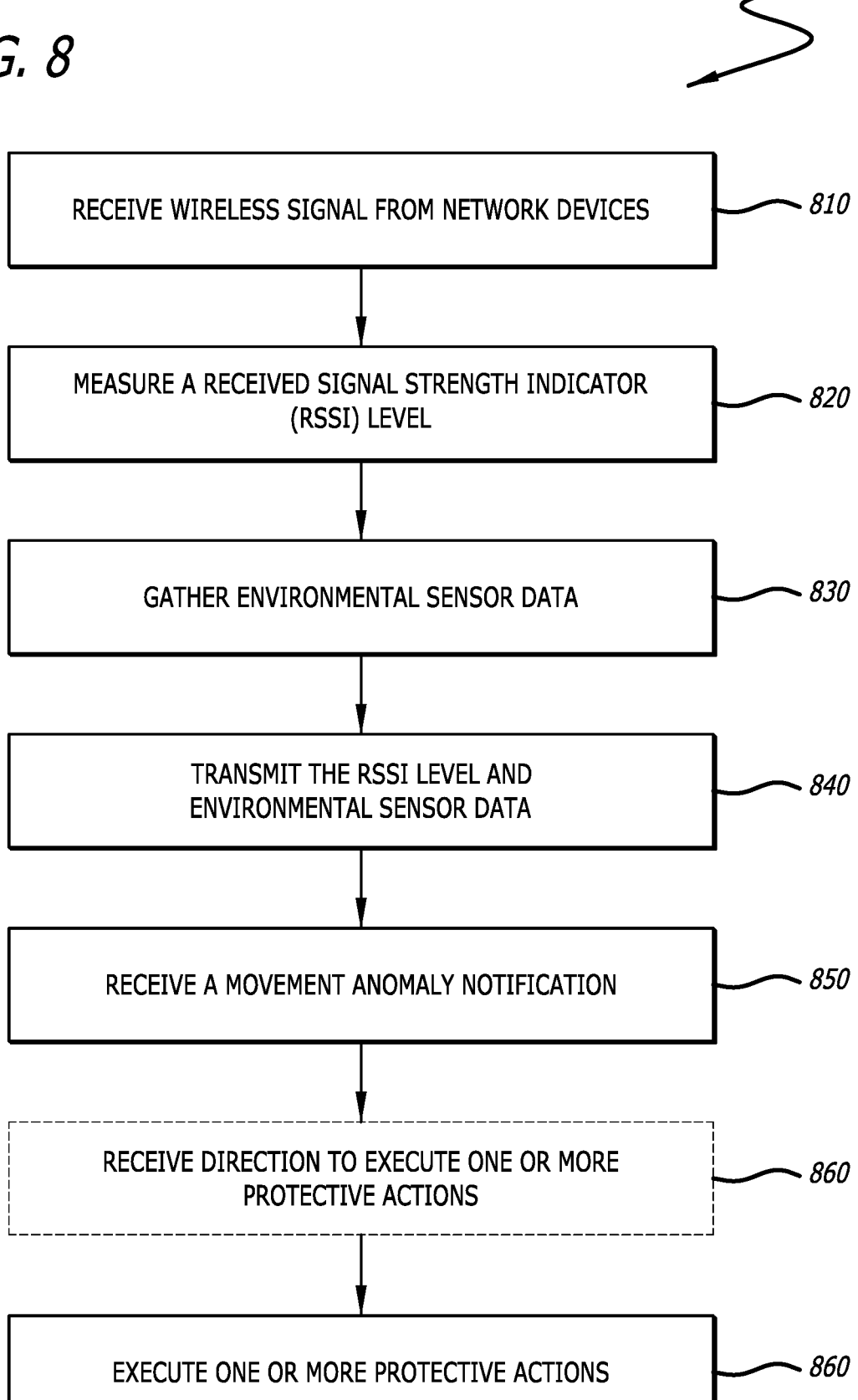
FIG. 8 is a flowchart depicting a process for utilizing a central management system for detecting and processing movement anomalies in accordance with various embodiments of the disclosure.

Referring to FIG. 8, a flowchart depicting a process 800 for utilizing a central management system for detecting and processing movement anomalies is shown. In certain embodiments, the network device may not have the processing power or hardware necessary to detect an anomalous movement internally. Likewise, large deployments of network devices may wish to be managed in a centralized management system (CMS). As a result, various embodiments may utilize a CMS to conduct one or more processing steps for determining the presence of an anomalous movement.

In many embodiments, the process 800 can receive wireless signal(s) from network devices (block 810). Similar to embodiments described above, neighboring network devices can emit wireless signals that can be received by other devices. These wireless signals may be transmitted directly, or can be broadcast out to any device for general reception.

In a number of embodiments, the process 800 can measure a received signal strength indicator (RSSI) level (block 820). Typically, these levels can be determined at the local device level. However, in certain embodiments, these signals may need to be transmitted to a centralized management system (CMS). This can occur in cases where legacy hardware is required that does not have current or functional system to make such measurements.

In more embodiments, the process 800 can gather environmental sensor data (block 830). In some embodiments, the environmental sensor data may be available via environmental sensors disposed on or within a network device. However, in certain embodiments, such as legacy devices without such environmental sensors, the environmental sensor data may be received from a CMS, a remote database, dedicated environmental sensors within the deployed area, or from environmental sensors on neighboring network devices.

In further embodiments, the process 800 can transmit the RSSI level and environmental sensor data (block 840). In many embodiments, the transmission is to a CMS for further processing. However, in some embodiments, the data may be transmitted to a neighboring device within the local network, such as to a neighboring network device that has available or additional processing power to detect anomalous movements. The transmission can be directed to the target device, or can be broadcast out for reception by any available network device or CMS.

In a variety of embodiments, the process 800 can receive a movement anomaly notification (block 850). In some embodiments, the movement anomaly notification is received in response to an external CMS or other device processing the transmitted data and generating the movement anomaly notification. In certain embodiments, the movement anomaly notification can be received from a neighboring device that has itself received and/or generated a movement anomaly notification. In this way, certain movement event notifications can be sent to a plurality of network devices without the need to process or otherwise detect movement anomalies on each network device. For example, if one network device in a location is moved due to a potential security attack, it may make sense to lock down other local devices through one or more protective actions.

In certain optional embodiments, the process 800 can receive direction to execute one or more protective actions (block 860). In numerous embodiments, the process 800 may not be sufficient to determine which protective action to take in response to a movement anomaly. In these embodiments, the CMS or other external device can determine the one or more protective actions to take and transmit these directions to an external device.

In still more embodiments, the process 800 can execute one or more protective actions. As discussed above, executing the one or more protective actions may be as a result of a direct protective action indicated by an external device. However, some embodiments may provide for the process 800 to determine which protective action to take in response to receiving a movement anomaly notification.

Although a specific embodiment for utilizing a central management system for detecting and processing movement anomalies suitable for carrying out the various steps, processes, methods, and operations described herein is discussed with respect to FIG. 8, any of a variety of systems and/or processes may be utilized in accordance with embodiments of the disclosure. For example, any step requiring processing may be offloaded to a CMS or other external device as needed. The elements depicted in FIG. 8 may also be interchangeable with other elements of FIGS. 1-7 and 9-11 as required to realize a particularly desired embodiment.

Figure 9:
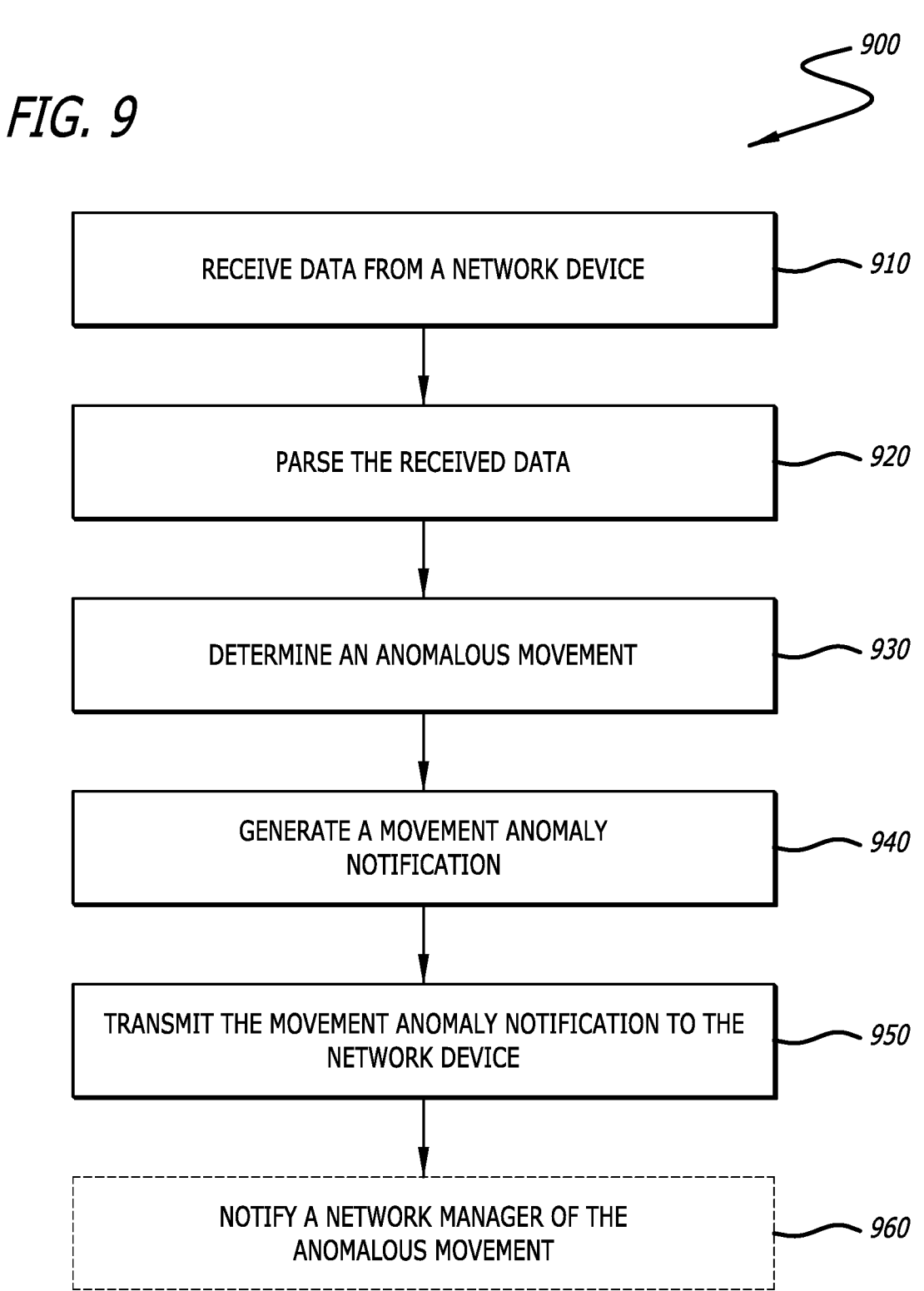
FIG. 9 is a flowchart depicting a process for operating a central management system for receiving data associated with movement anomalies in accordance with various embodiments of the disclosure.

Referring to FIG. 9, a flowchart depicting a process 900 for operating a central management system for receiving data associated with movement anomalies in accordance with various embodiments of the disclosure is shown. In many embodiments, the process 900 can receive data from network devices (block 910). In some embodiments, the process 900 can work on a single network device basis, meaning that each network device being managed is separate from each other. In additional embodiments, the process 900 can receive and process wireless signals from a plurality of network devices in tandem, or at least by utilizing data across each network device in certain instances.

In a number of embodiments, the process 900 can parse the received data (block 920). As those skilled in the art will recognize, data can be formatted in a variety of ways and may need changing before it can be processed in a subsequent step. Thus, various embodiments can parse the data to prepare it for determining anomalous movements. In some embodiments, the received data may be RSSI level data, environmental sensor signal data, or a combination of this data with other available data.

In further embodiments, the process 900 can determine an anomalous movement (block 930). As described above, the determination can be done in a variety of ways. For example, the received data may be in the format of various time series data from environmental sensors that are formatted as a series of measurements and/or a mapping of a delta or velocity of change. Comparing these values against a range or score previously determined or set as anomalous can yield a successful determination. However, it is contemplated that any type of data may be utilized as needed to make a useful determination of anomalous movement. Likewise, the determination can be done via a heuristic comparison or may be generated via one or more machine learning processes.

In more embodiments, the process 800 can generate a movement anomaly notification (block 940). As described above, the movement anomaly notification can be generated as a notification to a network administrator. In additional embodiments, the movement anomaly notification can be a signal, flag, or other message to another process, logic, or controller to respond to.

In a variety of embodiments, the process 800 can transmit the movement anomaly notification to the network device (block 950). The transmission can be from a CMS device to a deployed network device under management by the CMS. As stated above, the transmission may be to a single network device that is associated with the received data. However, still more embodiments may broadcast the notification to multiple devices, especially those neighboring the network device associated with the received data. In this way, a group of network devices may be notified of a potential anomalous move, perhaps spurring subsequent protective actions or at least evaluations if an anomalous movement is detected at those neighboring network devices.

In certain optional embodiments, the process 800 can notify a network manager of the anomalous movement (block 960). As described above, the notification can be sent to additional logics and/or controllers such that any protection actions may be taken automatically and without the network administrator's intervention. However, the movement anomaly may be formatted and sent to a network manager/administrator via any communication means, such as text, email, direct message, or phone call. It is contemplated that any notification may be utilized to satisfy the desired application of the deployment.

Although a specific embodiment for operating a central management system for receiving data associated with movement anomalies suitable for carrying out the various steps, processes, methods, and operations described herein is discussed with respect to FIG. 9, any of a variety of systems and/or processes may be utilized in accordance with embodiments of the disclosure. For example, movement anomaly notification may be formatted or paired with a plurality of protection action options that the network administrator can select from and direct the execution of in one or more network devices. The elements depicted in FIG. 9 may also be interchangeable with other elements of FIGS. 1-8 and 10-11 as required to realize a particularly desired embodiment.

Referring to FIG. 10, a flowchart depicting a process 1000 for utilizing neighboring network devices for movement detection by a central management system in accordance with various embodiments of the disclosure; is shown. In many embodiments, the process 1000 can receive data from a network device. Similar to the previous embodiment shown in the discussion of FIG. 9 some embodiments of the process 1000 can work on a single network device basis, meaning that each network device being managed is separate from each other. In additional embodiments, the process 1000 can receive and process wireless signals from a plurality of network devices in tandem, or at least by utilizing data across each network device in certain instances.

In further embodiments, the process 1000 can parse the received data for an anomalous movement (block 1020). Again, as those skilled in the art will recognize, data can be formatted in a variety of ways and may need changing before it can be processed in a subsequent step. Thus, various embodiments can parse the data to prepare it for determining anomalous movements. In some embodiments, the received data may be RSSI level data, environmental sensor signal data, or a combination of these data types with other available data both locally and externally available.

In a number of embodiments, the process 1000 can determine if an anomalous movement has been detected (block 1035). As previously described, the determination can be done in a variety of ways. For example, the received data may be in the format of various time series data from environmental sensors that are formatted as a series of measurements and/or a mapping of a delta or velocity of change. Comparing these values against a range or score previously determined or set as anomalous can yield a successful determination. However, it is contemplated that any type of data may be utilized as needed to make a useful determination of anomalous movement. Likewise, the determination can be done via a heuristic comparison or may be generated via one or more machine learning processes. If no anomalous movement is detected, then the process 1000 can again receive new data from a plurality of network devices (block 1010).

However, in response to an anomalous movement being detected, the process 1000 can request data from neighboring network devices (block 1040). In some embodiments, the request may be for similar data received from the original network device. In many embodiments, this can be RSSI level data, profile data, environmental sensor data, historical data, any combination thereof, and/or additional data available to the process 1000.

In more embodiments, the process 1000 can receive data from neighboring network devices (block 1050). The received data can be received from multiple devices at once, or may be packaged as a single transmission. For example, the request for neighboring device data and/or receiving the neighboring device data may, in certain embodiments, be accomplished by the original network device. In this way, only a single, previously established connection is required. Additionally, this could allow for gathering of data from neighboring devices that are not directly within the control or communication zone of the process 1000.

In additional embodiments, the process 1000 can evaluate the received data from all network devices (block 1060). In certain embodiments, the data may be evaluated against a predetermined threshold or score as part of a heuristic system. In additional embodiments, the data may be utilized as an input into one or more machine learning processes.

As a result of the evaluation, various embodiments of the process 1000 can determine if an anomalous movement occurred (block 1065). As previously discussed above, the process 1000 may have various types of data available for processing to make this determination. The determination may, for example, be based on data received from a single network device. In more embodiments, the determination can be done based on data from the network device associated with the received data and a plurality of neighboring network devices and their associated data. If the process 1000 determines that an anomalous movement has not occurred, the process 1000 can continue to receive data from a network device within the network (block 1010).

However, in response to a determination of an anomalous movement occurring, the process 1000 can generate a movement anomaly notification (block 1070). Again, the movement anomaly notification can be generated as a notification to a network administrator. In additional embodiments, the movement anomaly notification can be a signal, flag, or other message to another process, logic, or controller to respond to. In certain embodiments, the anomalous movement may affect multiple network devices. In these instances, it may be wise to generate a multi-device notification suitable for broadcast or transmission to the affected network devices.

In still further embodiments, the process 1000 can transmit the movement anomaly notification to any affected network device (block 1080). In certain embodiments, the determination of affected network devices can be made based on the received neighboring network device data and the type of anomalous movement detected. In additional embodiments, the process 1000 instead select a protective action and transmit the protective action to the affected network devices. This can be suitable for instances where there is a multi-device movement anomaly.

Although a specific embodiment for utilizing neighboring network devices for movement detection by a central management system suitable for carrying out the various steps, processes, methods, and operations described herein is discussed with respect to FIG. 10, any of a variety of systems and/or processes may be utilized in accordance with embodiments of the disclosure. For example, while various embodiments described with respect to FIG. 10 are directed to a CMS, it is contemplated that certain steps, if not all steps, can be completed by a network device coordinating within the deployed network or as a specialized device, similar to the embodiments highlighted in the discussion of FIG. 3 above. The elements depicted in FIG. 10 may also be interchangeable with other elements of FIGS. 1-9 and 11 as required to realize a particularly desired embodiment.

Figure 11:
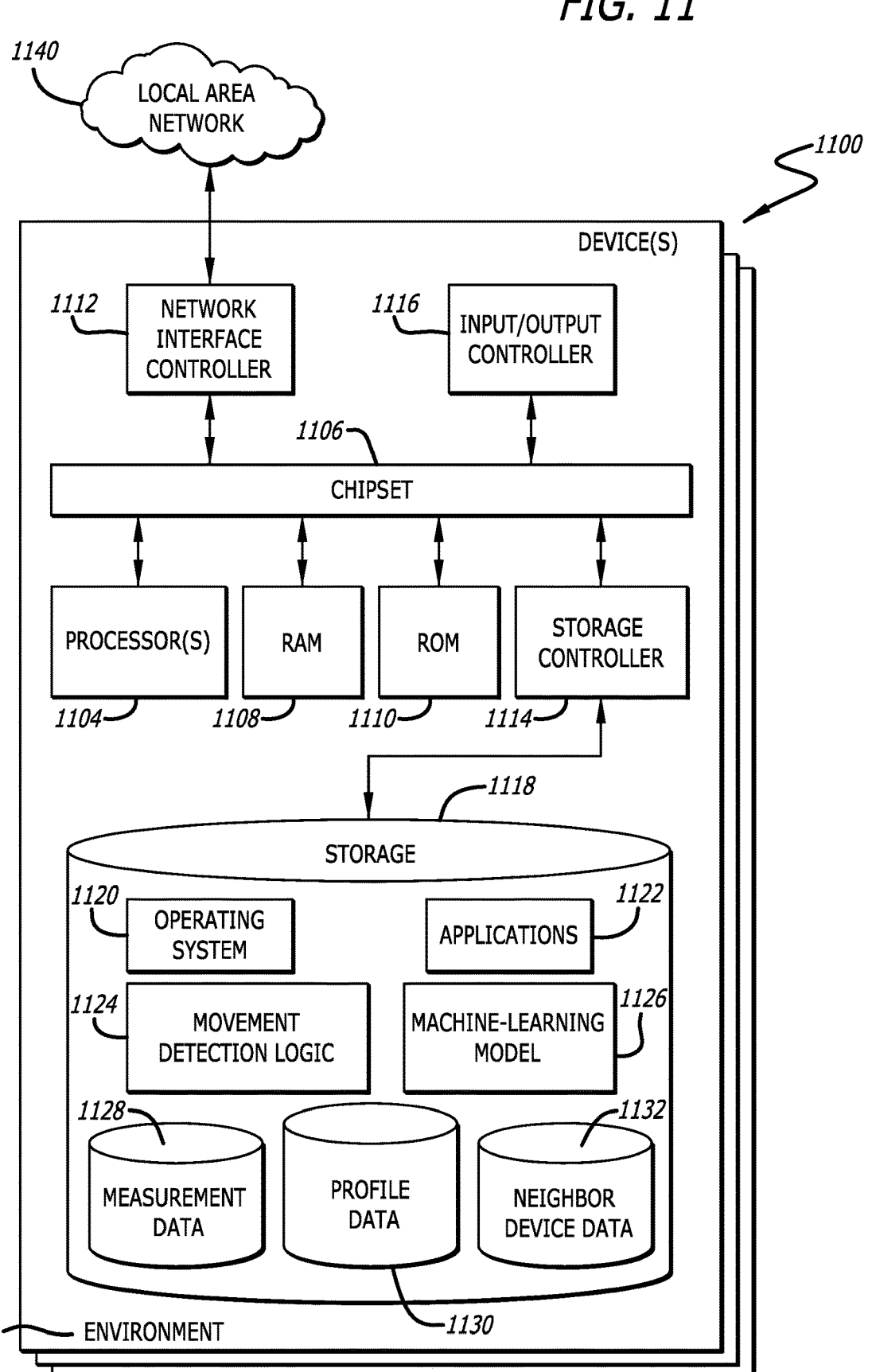
FIG. 11 is a conceptual block diagram of a device suitable for configuration with a movement detection logic in accordance with various embodiments of the disclosure.

Referring to FIG. 11, a conceptual block diagram of a device suitable for configuration with a movement detection logic in accordance with various embodiments of the disclosure is shown. The embodiment of the conceptual block diagram depicted in FIG. 11 can illustrate a conventional server computer, workstation, desktop computer, laptop, tablet, network device, access point, router, switch, e-reader, smart phone, centralized management service, or other computing device, and can be utilized to execute any of the application and/or logic components presented herein. The device 1100 may, in some examples, correspond to physical devices and/or to virtual resources and embodiments described herein.

In many embodiments, the device 1100 may include an environment 1102 such as a baseboard or "motherboard," in physical embodiments that can be configured as a printed circuit board with a multitude of components or devices connected by way of a system bus or other electrical communication paths. Conceptually, in virtualized embodiments, the environment 1102 may be a virtual environment that encompasses and executes the remaining components and resources of the device 1100. In more embodiments, one or more processors 1104, such as, but not limited to, central processing units ("CPUs") can be configured to operate in conjunction with a chipset 1106. The processor(s) 1104 can be standard programmable CPUs that perform arithmetic and logical operations necessary for the operation of the device 1100.

In additional embodiments, the processor(s) 1104 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1106 may provide an interface between the processor(s) 1104 and the remainder of the components and devices within the environment 1102. The chipset 1106 can provide an interface to communicatively couple a random-access memory ("RAM") 1108, which can be used as the main memory in the device 1100 in some embodiments. The chipset 1106 can further be configured to provide an interface to a computer-readable storage medium such as a read-only memory ("ROM") 1110 or non-volatile RAM ("NVRAM") for storing basic routines that can help with various tasks such as, but not limited to, starting up the device 1100 and/or transferring information between the various components and devices. The ROM 1110 or NVRAM can also store other application components necessary for the operation of the device 1100 in accordance with various embodiments described herein.

Different embodiments of the device 1100 can be configured to operate in a networked environment using logical connections to remote computing devices and computer systems through a network, such as the network 1140. The chipset 1106 can include functionality for providing network connectivity through a network interface card ("NIC") 1112, which may comprise a gigabit Ethernet adapter or similar component. The NIC 1112 can be capable of connecting the device 1100 to other devices over the network 1140. It is contemplated that multiple NICs 1112 may be present in the device 1100, connecting the device to other types of networks and remote systems.

In further embodiments, the device 1100 can be connected to a storage 1118 that provides non-volatile storage for data accessible by the device 1100. The storage 1118 can, for example, store an operating system 1120, applications 1122, and data 1128, 1130, 1132, which are described in greater detail below. The storage 1118 can be connected to the environment 1102 through a storage controller 1114 connected to the chipset 1106. In certain embodiments, the storage 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1100 can store data within the storage 1118 by transforming the physical state of the physical storage units to reflect the information being stored. The specific transformation of physical state can depend on various factors. Examples of such factors can include, but are not limited to, the technology used to implement the physical storage units, whether the storage 1118 is characterized as primary or secondary storage, and the like.

For example, the device 1100 can store information within the storage 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1100 can further read or access information from the storage 1118 by detecting the physical states or characteristics of one or more particular locations within the physical storage units.

In addition to the storage 1118 described above, the device 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1100. In some examples, the operations performed by a cloud computing network, and or any components included therein, may be supported by one or more devices similar to device 1100. Stated otherwise, some or all of the operations performed by the cloud computing network, and or any components included therein, may be performed by one or more devices 1100 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1118 can store an operating system 1120 utilized to control the operation of the device 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1118 can store other system or application programs and data utilized by the device 1100.

In various embodiment, the storage 1118 or other computer-readable storage media is encoded with computer-executable instructions which, when loaded into the device 1100, may transform it from a general-purpose computing system into a special-purpose computer capable of implementing the embodiments described herein. These computer-executable instructions may be stored as application 1122 and transform the device 1100 by specifying how the processor(s) 1104 can transition between states, as described above. In some embodiments, the device 1100 has access to computer-readable storage media storing computer-executable instructions which, when executed by the device 1100, perform the various processes described above with regard to FIGS. 1-8. In more embodiments, the device 1100 can also include computer-readable storage media having instructions stored thereupon for performing any of the other computer-implemented operations described herein.

In still further embodiments, the device 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can be configured to provide output to a display, such as a computer monitor, a flat panel display, a digital projector, a printer, or other type of output device. Those skilled in the art will recognize that the device 1100 might not include all of the components shown in FIG. 11 and can include other components that are not explicitly shown in FIG. 11 or might utilize an architecture completely different than that shown in FIG. 11.

As described above, the device 1100 may support a virtualization layer, such as one or more virtual resources executing on the device 1100. In some examples, the virtualization layer may be supported by a hypervisor that provides one or more virtual machines running on the device 1100 to perform functions described herein. The virtualization layer may generally support a virtual resource that performs at least a portion of the techniques described herein.

In many embodiments, the device 1100 can include a network capacity prediction logic 1124 that can be configured to perform one or more of the various steps, processes, operations, and/or other methods that are described above. While the embodiment shown in FIG. 11 depicts a logic focused on network capacity, it is contemplated that a more general "network needs" logic may be utilized as well or in lieu of such logic. Often, the network capacity prediction logic 1124 can be a set of instructions stored within a non-volatile memory that, when executed by the controller(s)/processor(s) 1104 can carry out these steps, etc. In some embodiments, the network capacity prediction logic 1124 may be a client application that resides on a network-connected device, such as, but not limited to, a server, switch, personal or mobile computing device in a single or distributed arrangement. In certain embodiments, the network capacity prediction logic 1124 can be a dedicated hardware device or be configured into a system on a chip package (FPGA, ASIC and the like).

In a number of embodiments, the storage 1118 can include measurement data 1128. As discussed above, the measurement data 1128 can be collected in a variety of ways and may involve data related to multiple network devices. The measurement data 1128 may be associated with an entire network or a portion/partition of a network. This may also include a relationship of the various associated devices that are associated with each other. In additional embodiments, the measurement data 1128 can include not only the environmental sensor data, and RSSI level data associated within but may also include details about the hardware configuration and/or capabilities of the network devices within the floorplan/deployment. This can allow for more reliable determinations based on a wider set of factors.

In various embodiments, the storage 1118 can include profile data 1130. As described above, profile data 1130 can be configured to include various items such as past need levels, client connection histories, as well as previously determined anomalous movements and the measurements that preceded them. The profile data may be formatted to store a range of values for each type of data evaluated. These values can be utilized to compare against current values of one or more network devices to determine if they are suffering from an anomalous movement. This profile data can be provided by the manufacturer prior to deployment. However, network administrators may train these values by utilizing feedback on correct and incorrect detected movements.

In still more embodiments, the storage 1118 can include neighbor device data 1132. As discussed above, neighboring device data can be utilized to verify the presence or scale of an anomalous movement. Likewise, by utilizing neighbor device data 1132, the type of movement may be better discerned. For example, a physical attack on a network device may often limit movement anomalies to the devices under attack, looking like a singular event with no precursor. Likewise, verifying similar environmental sensor signals on neighboring network devices may highlight that the change is happening to multiple units, and may not indicate a movement at all.

Finally, in many embodiments, data may be processed into a format usable by a machine-learning model 1126 (e.g., feature vectors, etc.), and or other pre-processing techniques. The machine learning ("ML") model 1126 may be any type of ML model, such as supervised models, reinforcement models, and/or unsupervised models. The ML model 1126 may include one or more of linear regression models, logistic regression models, decision trees, Naïve Bayes models, neural networks, k-means cluster models, random forest models, and/or other types of ML models 1126. The ML model 1126 may be configured to learn the pattern of historical movement data of various network devices and generate predictions and/or confidence levels regarding current anomalous movements. In some embodiments, the ML model 1126 can be configured to determine which method of generating those predictions would work best based on certain conditions or with certain network devices.

The ML model(s) 1126 can be configured to generate inferences to make predictions or draw conclusions from data. An inference can be considered the output of a process of applying a model to new data. This can occur by learning from at least the topology data, historical data, measurement data, profile data, neighboring device data, and/or the underlying algorithmic data and use that learning to predict future outcomes and needs. These predictions are based on patterns and relationships discovered within the data. To generate an inference, such as a determination on anomalous movement, the trained model can take input data and produce a prediction or a decision/determination. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1126 may be generated by human/administrator verifications or may compare predicted outcomes with actual outcomes. The training set of the ML model(s) 1126 can be provided by the manufacturer prior to deployment and can be based on previously verified data.

Although a specific embodiment for a device suitable for configuration with a network capacity prediction logic suitable for carrying out the various steps, processes, methods, and operations described herein is discussed with respect to FIG. 11, any of a variety of systems and/or processes may be utilized in accordance with embodiments of the disclosure. For example, the device may be in a virtual environment such as a cloud-based network administration suite, or it may be distributed across a variety of network devices or APs such that each acts as a device and the network capacity prediction logic 1124 acts in tandem between the devices. The elements depicted in FIG. 11 may also be interchangeable with other elements of FIGS. 1-8 as required to realize a particularly desired embodiment.

Information Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
at least one network interface controller configured to provide access to a network; and
a memory communicatively coupled to the processor, wherein the memory comprises a movement detection logic that is configured to:
receive at least one wireless signal from a second network device;
measure a received signal strength indicator (RSSI) level based on the at least one wireless signal;
evaluate one or more environmental sensor signals; and
determine an anomalous movement of the device from a static deployment based on comparing the one or more environmental sensor signals against a profile of acceptable movements.

2. The device of claim 1, wherein the RSSI level is compared against a first predetermined threshold.

3. The device of claim 2, wherein the evaluation of the one or more environmental sensor signals are evaluated in response to the RSSI level exceeding the first predetermined threshold.

4. The device of claim 1, wherein the RSSI levels are received from a plurality of external devices.

5. The device of claim 4, wherein the plurality of external devices is stationary at a fixed distance from the device.

6. The device of claim 1, wherein the one or more environmental sensor signals are evaluated over a period of time.

7. The device of claim 6, wherein the evaluation is configured to determine one or more deltas within the one or more environmental sensor signals.

8. The device of claim 7, wherein the determined one or more deltas are compared against a second predetermined threshold.

9. The device of claim 8, wherein the movement detection logic is further configured to generate a movement anomaly notification in response to at least one of the determined one or more deltas exceeded the second predetermined threshold.

10. The device of claim 8, wherein the second predetermined threshold is associated with a profile of acceptable device movements.

11. The device of claim 8, wherein the movement detection logic is further configured to execute one or more protective actions in response to at least one of the determined one or more deltas exceeded the second predetermined threshold.

12. The device of claim 11, wherein the one or more protective actions are at least one of: rebooting the device, adjusting one or more settings, or ceasing service to one or more clients.

13. A device, comprising:

a processor;

at least one network interface controller configured to provide access to a network; and a memory communicatively coupled to the processor, wherein the memory comprises a movement detection logic that is configured to:

receive at least one wireless signal from a second network device;

measure a received signal strength indicator (RSSI) level based on the at least one wireless signal;

measure one or more environmental sensor signals;

transmit the measured environmental sensor signals to an external management device;

receive a movement anomaly notification from the external management device indicating an anomalous movement of the device from a static deployment based on a comparison of the one or more environmental sensor signals against a profile of acceptable movements; and execute one or more protective actions.

14. The device of claim 13, wherein the transmission further comprises the RSSI level associated with the at least one wireless signal.

15. The device of claim 13, wherein the RSSI level is compared against a first predetermined threshold.

16. The device of claim 15, wherein an evaluation of the one or more environmental sensor signals are evaluated in response to the RSSI level exceeding the first predetermined threshold.

17. A management device, comprising:

a processor;

at least one network interface controller configured to provide access to a network; and a memory communicatively coupled to the processor, wherein the memory comprises a movement detection logic that is configured to:

receive one or more environmental sensor signals from a network device;

evaluate the received one or more environmental sensor signals;

detect an anomalous movement of the network device from a static deployment based on comparing the one or more environmental sensor signals against a profile of acceptable movements;

generate a movement anomaly notification; and transmit the movement anomaly notification to the network device.

18. The management device of claim 17, wherein the one or more environmental sensor signals are received and evaluated over a period of time.

19. The management device of claim 17, wherein, in response to the detection of an anomalous movement, the movement detection logic is further configured to:

request data from at least one additional network device in proximity to the network device;

receive data from the at least one additional network device;

evaluate if an anomalous movement is detected in one or more of the at least one additional network device; and detect a multi-device movement anomaly in response to the detection of a similar anomalous movement in the at least one additional network device.

20. The management device of claim 19, wherein the movement detection logic is further configured to, in response to a multi-device movement anomaly being detected:

generate a plurality of protective actions; and transmit the plurality of protective actions to the network devices associated with the multi-device movement anomaly.

* * * * *